United States Patent [19]

Ozone et al.

[11] Patent Number: 5,990,933

[45] Date of Patent: *Nov. 23, 1999

[54] APPARATUS AND METHOD FOR STORAGE AND PLAYBACK OF VIDEO IMAGES AND AUDIO MESSAGES IN MULTIPOINT VIDEOCONFERENCING

[75] Inventors: Daniel F. Ozone, Norwood; Christopher L. Dischino, Somerville, both of Mass.; Nelson Shen, Nashua, N.H.; Vilas V. Bhade, Natick, Mass.; Tak Szeto, Brighton, Mass.; Brittain S. McKinley, Newton, Mass.; Peter J. Donovan, Billerica, Mass.; Daniel E. Zeck, Acton, Mass.; Charles F. Sharkey, Hudson, N.H.

[73] Assignee: VideoServer, Inc., Burlington, Mass.

[ * ] Notice: This patent is subject to a terminal disclaimer.

[21] Appl. No.: 09/273,966

[22] Filed: Mar. 22, 1999

Related U.S. Application Data

[63] Continuation of application No. 08/790,289, Jan. 28, 1997, Pat. No. 5,886,734.

[51] Int. Cl.[6] ....................................................... H04N 7/15
[52] U.S. Cl. ........................... 348/15; 379/93.21; 379/202
[58] Field of Search ..................... 348/14–19; 379/93.01, 379/93.09, 93.11, 93.17, 93.21, 93.22, 202, 204–206

[56] References Cited

U.S. PATENT DOCUMENTS

| | | | |
|---|---|---|---|
| 4,516,156 | 5/1985 | Fabris et al. | . |
| 4,691,347 | 9/1987 | Stanley et al. | 379/203 |
| 5,600,646 | 2/1997 | Polomski | 370/263 |
| 5,710,591 | 1/1998 | Bruno et al. | 348/15 |
| 5,886,734 | 3/1999 | Ozone et al. | 348/15 |

FOREIGN PATENT DOCUMENTS

WO 96/42152  12/1996  WIPO .

OTHER PUBLICATIONS

Horn, D.N., et al., "A Standards–Based Multimedia Conferencing Bridge," *AT&T Technical Journal*, pp. 41–49 (Jan.–Feb. 1993).

"Multilink Announces Availability of System 80 Videoconferencing Bridge," http://www.multilink.com/sys.80.htm, pp. 1–2 (May 21, 1996).

"British Telecom Chooses VideoServer Multimedia Conference Servers for the World's First Coordinator Attended Videoconferencing Service," http://www.videoserver.com/htm/press29.htm, pp. 1–2 (Aug. 6,1996).

*Primary Examiner*—Wing F. Chan
*Attorney, Agent, or Firm*—Hamilton, Brook, Smith & Reynolds, P.C.

[57] ABSTRACT

In a multipoint control unit for conferencing audiovisual terminals, conference participants are greeted with audio and video welcome messages and then placed in an automated queue. The automated queue is a holding queue from which a conference operator can select the next available conference participant in the queue and conduct a subconference. Apparatus in the multipoint control unit includes a memory for storing video data and a processor coupled to the memory for controlling playback of the video data to a connected terminal during conference setup.

51 Claims, 11 Drawing Sheets

APPARATUS AND METHOD FOR STORAGE AND PLAYBACK OF VIDEO IMAGES AND AUDIO MESSAGES IN MULTIPOINT VIDEOCONFERENCING

RELATED APPLICATIONS(S)

This application is a Continuation of 08/790,289 filed on Jan. 28, 1997, the entire teachings of which are incorporated herein by reference, now U.S. Pat. No. 5,886,734.

BACKGROUND OF THE INVENTION

In multipoint videoconferencing, three or more endpoint terminals communicate with each other across a network. In the current telecommunications environment, multipoint conferencing is usually implemented over circuit-switched communication networks. Since connections are point-to-point in a circuit-switched network, a centralized resource, known as a multipoint control unit (MCU), is needed to link the multiple endpoints together. The MCU performs this linking by receiving multimedia (audio, video and/or data) information signals from endpoint terminals over point-to-point connections, processing the received information signals, and retransmitting the processed signals to selected endpoint terminals in the conference.

In the past, multipoint videoconferencing generally has been operated in an automated, unattended fashion whereby conference participants have been self-sufficient in the process of initiating and conducting a conference call. In such an automated unattended conference mode, an operator typically became involved only when a problem was encountered during the conference. The conference operator might be engaged by dialing #0 at the participant's terminal or by directly calling the operator via a separate telephone line. This is similar to the model used by many audio conferencing service providers in which two telephone numbers are assigned for a conference, one for the conference attendees and the other for the conference moderator to reach the operator.

SUMMARY OF THE INVENTION

In automated, unattended multipoint videoconferencing, the first conference participant to connect to the MCU typically receives a loopback of its own video signal. Because the loopback video signal is seen instead of that of another conference participant, the first conference participant often mistakenly disconnects from the MCU, thinking that the conference has not been reached.

The above and other problems are solved by the apparatus and method of the present invention. The present invention provides improvements to conferencing by adding functionality to support operator attended conferencing. In an operator attended conference, each conference participant is greeted by an operator to assist with various functions, such as welcoming the participant, checking audio and video levels, and placing the participant into the conference. In the preferred embodiment, conference participants are initially greeted by playback of stored audio and video messages and then placed in an automated queue. The automated queue is a holding queue from which an operator can select the next available conference participant in the queue and perform the above noted conferencing functions for the participant.

Accordingly, a multipoint control unit for conferencing audiovisual terminals includes a memory for storing video data, preferably a still image comprising an H.261 QCIF intramode frame. A processor is coupled to the memory for controlling playback of the video data to an audiovisual terminal connected to the multipoint control unit. The processor retrieves the video data from the memory during conference setup and transmits the video data to the audiovisual terminal. In addition to the video data, the memory further stores audio data for playback with the video data. The video transmission includes fill blocks for synchronizing framing between the multipoint control unit and the connected audiovisual terminal.

According to one aspect of the invention, a video teleconferencing system includes audiovisual terminals at user sites and a multipoint control unit for conferencing the terminals. The multipoint control unit includes a memory for storing video data and a processor for controlling playback of the video data. An operator site connected to the multipoint control unit for controlling a conference includes means for placing the terminals in an operator queue. The processor retrieves the video data from memory and transmits the video data to the queued terminals during conference setup.

According to a method of the present invention, an operator site for controlling a conference is provided. A plurality of user sites, each having an audiovisual terminal, is further provided along with a multipoint control unit for conferencing the terminals and the operator site. The method further includes the steps of storing video data in a memory of the multipoint control unit, connecting one of the terminals to the multipoint control unit, placing the connected terminal in an operator queue at the operator site, and retrieving the video data from memory and transmitting the video data to the queued terminal.

According to another aspect, the operator conducts a subconference with the queued terminal and then connects the queued terminal to an active conference.

BRIEF DESCRIPTION OF THE DRAWINGS

The above and other features of the invention including various novel details of construction and combinations of parts will now be more particularly described with reference to the accompanying drawings and pointed out in the claims. It will be understood that the particular apparatus embodying the invention is shown by way of illustration only and not as a limitation of the invention. The principles and features of this invention may be employed in varied and numerous embodiments without departing from the scope of the invention.

DETAILED DESCRIPTION OF THE PREFERRED EMBODIMENTS

Figure 1:
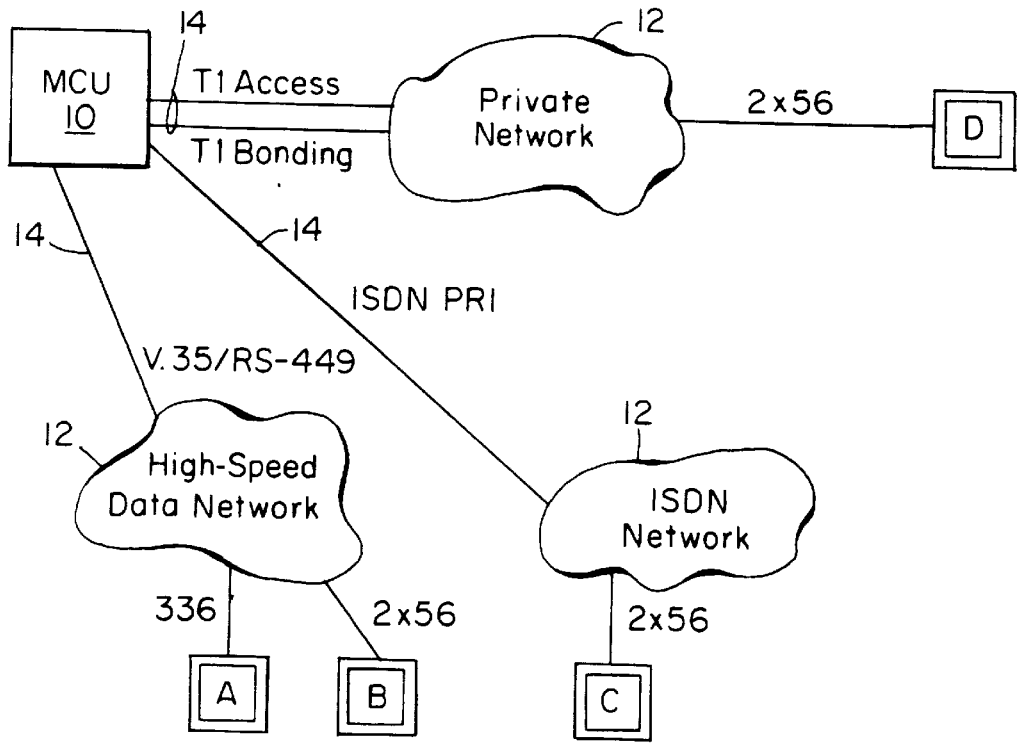
FIG. 1 diagrammatically illustrates a video teleconferencing system having multiple audiovisual terminals connected to an MCU through a variety of networks.

Referring to FIG. 1, a video teleconferencing system is shown in which audiovisual terminals A, B, C, and D are connected in a conference to an MCU 10 through a variety of communication networks 12, each network having a particular type of access interface 14 to the MCU 10, e.g., V.35/RS-449 for high-speed data networks, PRI for ISDN networks, and T1 access for private networks.

In the present invention, incoming calls from conference participants are automatically answered and placed in a single operator hold queue. For audio-only endpoint terminals, an audio greeting or welcome message specific to the phone number dialed or the physical port reached at the MCU is played to the conference participant. For audiovisual terminals, a stored video clip or still image welcome message is also transmitted to the participant. While in the queue, both types of conference participants receive music-on-hold after the initial audio greeting. The ability to assign audio and video clips/still images to phone numbers or MCU ports allows a conference service provider to support multiple, private-labeled conferencing services or to support customers that want their own company-specific information displayed to participants who are holding for their conferences.

Figure 2:
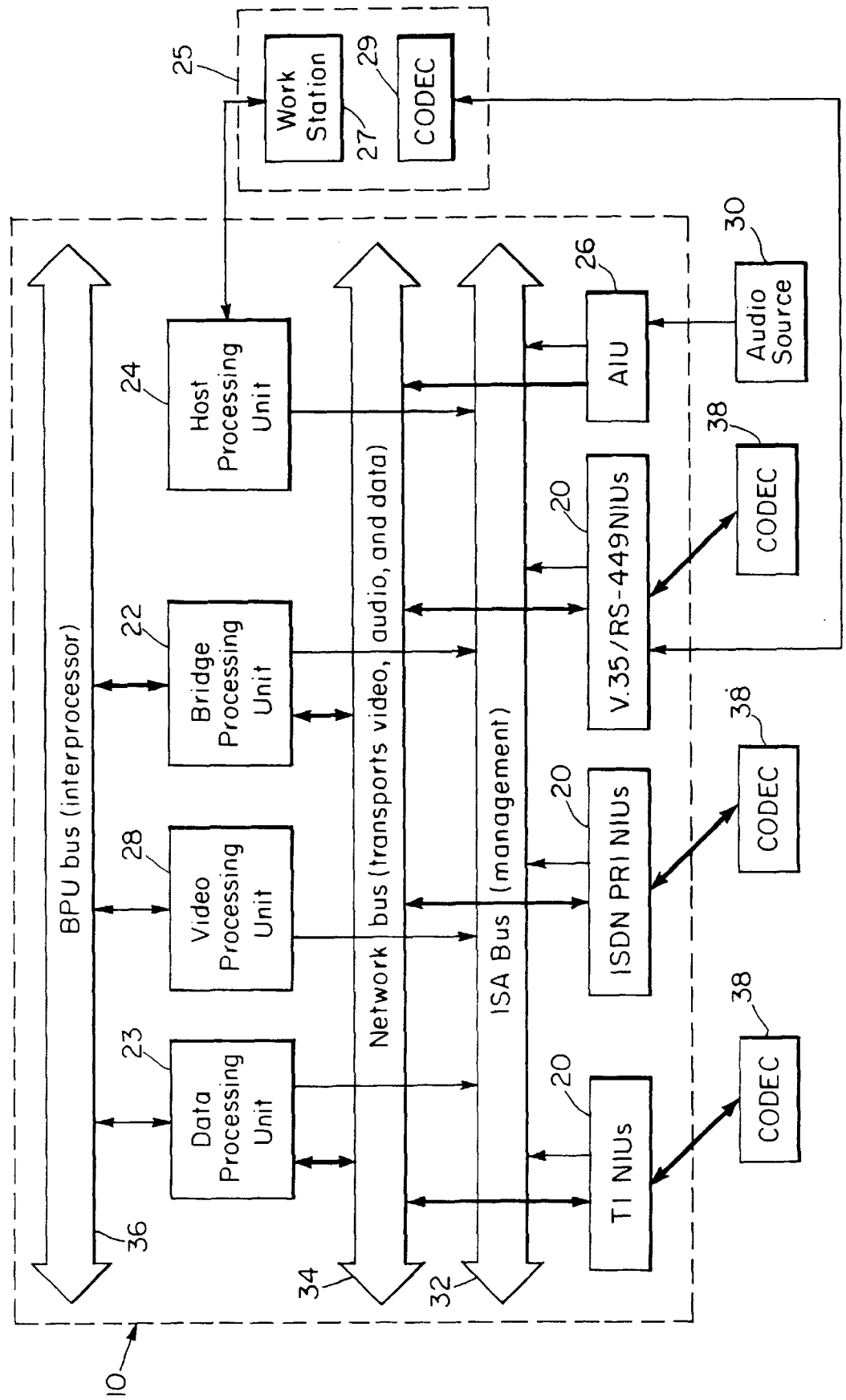
FIG. 2 is a block diagram of an MCU configuration.

The present invention will be described in the environment of a particular preferred embodiment of an MCU. It will be understood that the principles and features of the invention can be employed in other MCU embodiments. FIG. 2 illustrates MCU 10 installed in a host 80386 or 80486-based PC, further disclosed in U.S. patent application No. 08/379,274, which is incorporated herein in its entirety by reference. The host can also be a Pentium®-based PC. MCU 10 includes at least one Network Interface Unit (NIU) 20, at least one Bridge Processing Unit (BPU) 22, an optional Data Processing Unit (DPU) 23, an optional Video Processing Unit (VPU) 28 and a Host Processing Unit (HPU) 24. In addition to a host Industry Standard Architecture (ISA) bus 32, the MCU 10 includes a Network Bus 34 and a BPU Bus 36. The Network Bus 34 complies with the Multi-Vendor Integration Protocol (MVIP) while the BPU Bus 36 is a derivative of the MVIP specification. External audiovisual terminals, or codecs 38, connect to the MCU 10 to form conferences. The foregoing MCU elements are further described in the above-referenced patent application.

To support certain aspects of the present invention, the MCU 10 also includes an Audio Interface Unit (AIU) 26 which is coupled to an external audio source 30. The function of the AIU 26 is described further below. An operator site 25 provides a workstation 27 for conference management and control through the HPU 24 and a codec 29 for use by an operator to support operator attended conferencing. While the codec 29 is shown connected to a particular NIU 20 that provides a V.35/RS-449 access interface, the codec can also be connected through other access interfaces, e.g., T1 or ISDN.

The MCU operation will now be described at a high-level with respect to FIG. 2. Each codec 38, typically an H.320 audiovisual terminal, connects to the MCU 10 through a communication network. Unsynchronized digital data frames from each codec 38 are made available on the Network bus 34 through NIUs 20. The BPUs 22 process the unsynchronized data frames from the Network Bus 34 to produce data frames aligned on an octet boundary which are made available to other BPUs 22 on the BPU bus 36. The BPUs 22 also extract audio information from the data frames. The audio information is decoded to PCM data and made available on the BPU bus 36 for mixing with audio from other codecs 38 by respective BPUs 22 in a conference. The BPUs 22 combine compressed video information and mixed encoded audio information into frames which are placed on the Network Bus 34 for transmission to respective codecs 38. The optional DPU 23 performs processing functions similar to the BPUs 22 to support ITU-TSS Rec. T.120 data conferencing. The present invention is thus compatible with, and transparent to, T.120 data conferencing.

In a standard conference, the BPUs 22 perform video switching within a conference by selecting video data frames from timeslots on the BPU bus 36 and routing the frames to respective codecs 38 in the conference. A particular BPU 22 selects the appropriate video data frames based upon an MCU conference selection process. Typically, the selection process is based upon a comparison of the voice levels of the conference locations. Initially, the loudest conference location is designated the current broadcaster to be viewed by all other conference locations while the current broadcaster typically views another location. A subsequent loudest conference location becomes the current broadcaster only after the previous broadcaster has been silent for a period of time. In alternative conference selection processes, an MCU operator or a particular audiovisual terminal operating in a chair control mode selects a location as the current broadcaster. In conferences which use composite images or continuous presence, multiple video inputs are sent to a VPU 28 where the video inputs are decompressed, mixed and recompressed into a single video stream. This single video stream is then passed back through the BPU 22 which switches the video stream to the appropriate endpoint codecs.

Having provided an overview of the MCU operation, each of the buses and the major system components will be described further. The MVIP-compliant Network Bus 34 comprises eight full-duplex, serial time-division multiplexed 125 µs data streams which adhere to the Mitel ST-BUS (Serial Telecom) Generic Device Specification. Each data stream operates at 2 Mbps and is divided into 32 separate timeslots. The total capacity of the bus is therefore 256 timeslots with each timeslot having a capacity of 64 Kbps. In addition to being time-division multiplexed within a data stream, the digital data is space-division multiplexed across the data streams. In this way, a frame of digital data from a communications network can be multiplexed across any of the 256 timeslots for intra-MCU communications.

The MVIP-derivative BPU bus 36, also referred to as an interprocessor bus, is a TDM serial bus capable of handling sixteen streams. In one embodiment, each stream operates at 2 Mbps, and has 32 timeslots, each timeslot at 64 Kbps for a total of 32 Mbps transfer rate. In another embodiment operating at 4 Mbps, there are 64 timeslots in each stream, for a total of 64 Mbps.

The HPU 24 provides a management interface to a workstation 27 for MCU operations. Through the HPU 24, an operator can control and manage the operation of the other components. The HPU 24 controls the setup and establishment of conferences, and performs monitoring and maintenance functions.

Each NIU 20 connects the MCU 10 with a particular communications network to a particular codec 38 through an appropriate interface port. The NIU 20 formats the digital data frames that pass between the MCU 10 and codecs 38 for transmission within the MCU 10 and across the various communications networks. The most common type of NIU 20 supports a single T1 or ISDN primary rate interface over which the network service (e.g., a communications carrier) has time-division-multiplexed a number of individual codec connections. The MCU 10 can also include NIUs having interface ports that support only single codec connections.

The frame structure for the data exchanged between the MCU 10 and the codecs 38 is defined in ITU-TSS Rec. H.221. Each NIU 20 reformats the digital data frames from the incoming line to an internal MCU format that is independent of the individual codec interfaces to the communications network. The reformatted data is then multiplexed onto the Network Bus channels for transmission to the BPUs 22.

The BPUs 22 handle video switching within conferences by selecting and routing time and space-division multiplexed digital data. Each BPU 22 can support four codecs (audiovisual terminals) and multiple BPUs may be connected through the BPU bus 36. For each codec connection, the BPU 22 demultiplexes the digital data frames from the Network Bus 34, mixes the digital audio data, and multiplexes new digital data frames onto the Network Bus 34 from the mixed digital audio and the appropriate digital video and conferencing data.

Figure 3:
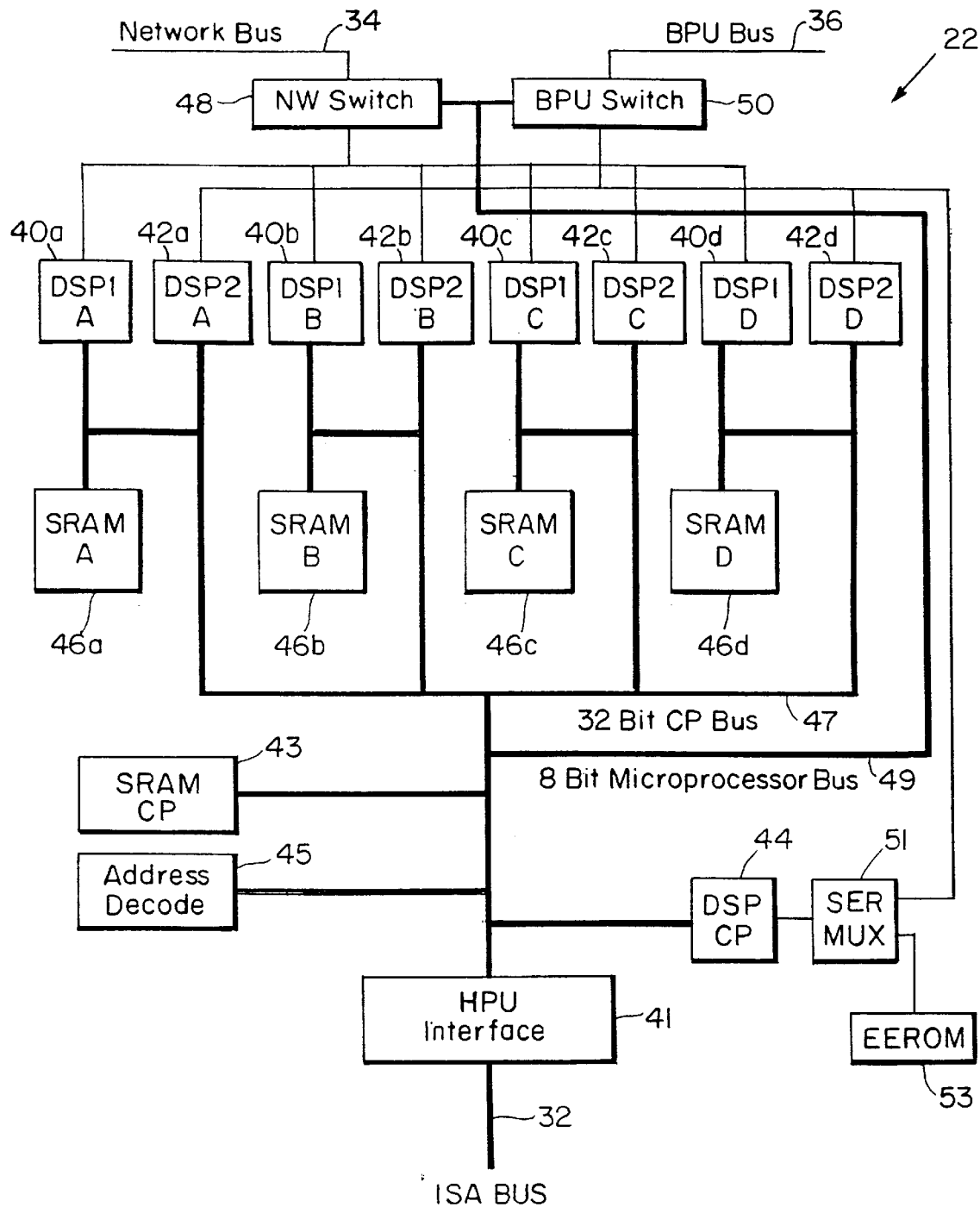
FIG. 3 is a block diagram of a Bridge Processing Unit of the MCU configuration of FIG. 2.

A detailed block diagram of BPU 22 is illustrated in FIG. 3. The BPU 22 is segmented into four partitions (A, B,C,D), each partition having a pair of Digital Signal Processors (DSP) 40, 42 assignable to a particular codec. Each BPU partition (A,B,C,D) contains a first DSP (DSP1) 40 and a second DSP (DSP2) 42. In general, DSP1 40 transfers and analyzes data to and from the Network Bus 34 and manages a buffer for this data in SRAM memory 46 shared between DSP1 40 and DSP2 42. In general, DSP2 42 processes data that has been pre-processed by DSP1 40 and maintains inter-BPU communications over the BPU Bus 36. The DSP1 40 and DSP2 42 perform their processing functions synchronously with respect to the timing on the BPU bus 36 and the Network bus 34. The processing of audio and video streams in accordance with the present invention is described further below.

Each BPU 22 also has a DSP that functions as a Control Processor (CP) 44 which maintains a list of partition associations. Because the data streams on the Network Bus 34 and BPU Bus 36 are time and space division multiplexed, the CP 44 operates a Time Division Multiplexer (TDM) having a network switch 48 and a BPU switch 50 to direct selected digital data frames from the data channels to the correct BPU partition. The TDM may be implemented by a Mitel MT8980D Digital Switch. The CP 44 supports a 32 bit CP bus 47 to the DSPs 40, 42 in the four partitions (A,B,C,D). In addition, the CP 44 supports an 8 bit bus 49 to the network switch 48 and the BPU switch 50. The CP 44 interfaces to TDM data streams through serial multiplexer 51. BPU configuration information may be stored in EEROM 53.

The BPU 22 has an HPU interface 41 which allows the HPU 24 (FIG. 2) to perform memory access of a CP SRAM memory 43 and I/O access to control the CP 44. Address decode block 45 supports HPU I/O access to the BPU 22 using programmable switches selected by system configuration.

Broadly, the DPU 23 performs two functions: 1) protocol handling of T.120 stacks for multilayer protocol (MLP) conferencing applications and 2) protocol handling, video bridging and audio processing for PCS (Intel) codec applications. MLP is defined in the H-series Recommendations H.200/AV.270 and will not be discussed further.

At this point, the operator hold queue and conference control functionality of the present invention will be described. Details on implementing the audio and video messaging aspects of the invention in MCU 10 follow thereafter.

Figure 4:
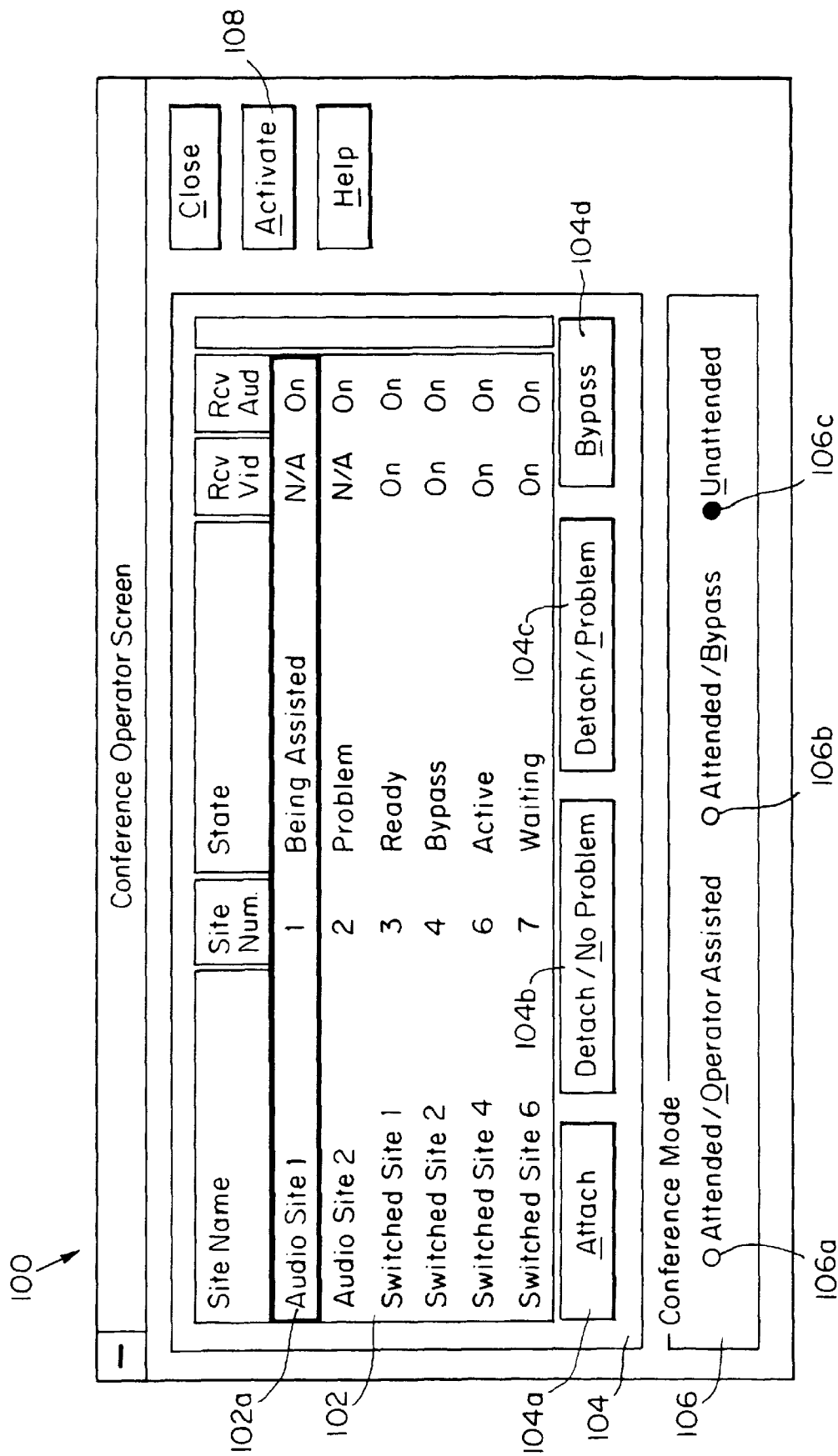
FIG. 4 illustrates a conference operator queue screen in accordance with the present invention.

Referring now to FIG. 4, a screen 100 is shown which illustrates conference operator queue information presented to an operator on workstation 27 (FIG. 2). The screen 100 includes a conference site information window 102, a site action area 104, and a conference mode area 106. The conference site information window 102 includes a list of conference sites. Each entry 102a includes fields labeled site name, site number, conference site state, and received signal state. The entries are listed chronologically with the most recently connected sites at the bottom. The operator site is not included in the list.

In attended conference modes, pre-test time is provided such that a conference participant experiences a transition from a preparation period to a formalized or active conference. An activate button 108 allows the operator the choice of shortening the pre-test time and making the conference active. Once activated, or when the pre-test time expires, the conference cannot be made inactive again.

In operation, the conference operator selects a conference site listed in the queue of the conference site information window 102 and selects one of the actions available in the site action area 104 depending on the current state of the conference site and on the current conference mode. These conference states and site actions will now be described.

Figure 5:
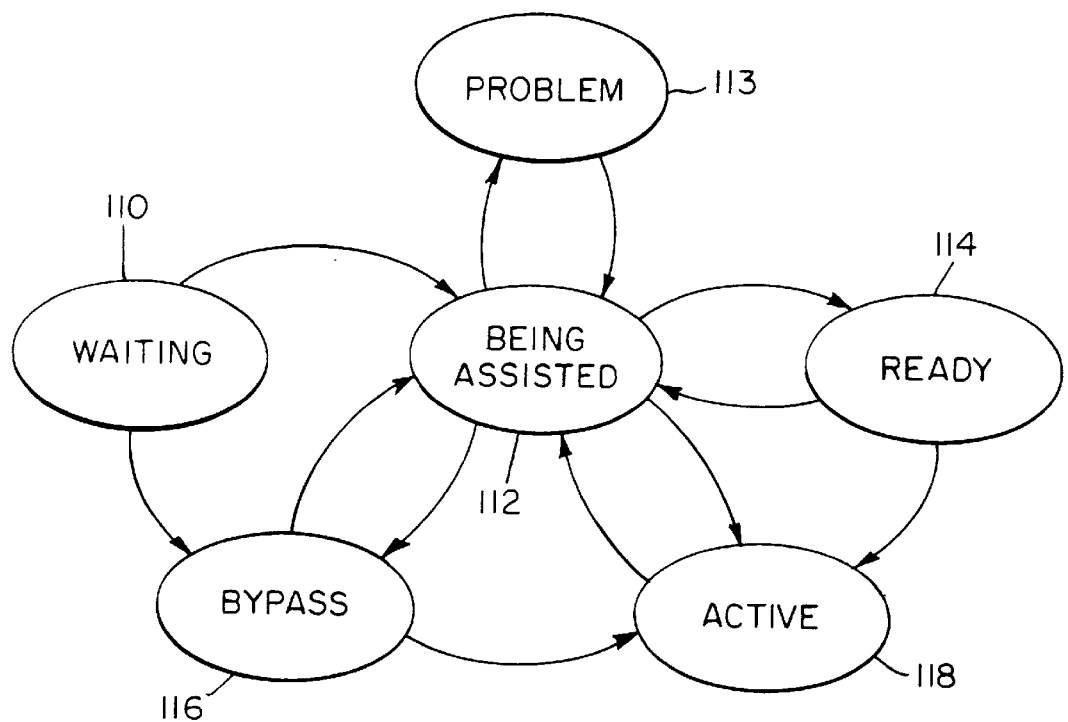
FIG. 5 is a state diagram illustrating the conference site states in accordance with the present invention.

The conference site states are shown in the state diagram of FIG. 5 and are described as follows. A conference site entering the operator queue of an Attended/Operator Assisted conference initially is placed in a Waiting state 110. While in the Waiting state 110, the site receives music-on-hold and the audio/video greeting and waits to be assisted by an operator. A conference site in the Waiting state 110 can move to either a Being Assisted state 112 or a Bypass state 116, depending on specific actions by the operator. A conference site in the Waiting state 110 transitions to the Being Assisted state 112 when an operator selects the site from the operator queue and begins a subconference to check the audio and video signal quality for that site. A transition from the Waiting state 110 to the Bypass state 116 occurs when the operator selects the site from the operator queue and sends the site into the conference without any assistance.

A conference site in the Being Assisted state 112 can move to either a Problem state 113, a Ready state 114, a Bypass state 116, or an Active state 118, depending on specific actions by the operator and on the conference state itself. A transition to the Problem state 113 occurs when an operator determines that a problem exists with the audio and/or video signals being received from that particular site. Accordingly, the audio and video signals from a site in the Problem state 113 are not passed into an active conference until the problem is resolved. However, the site continues to receive music-on-hold and the video greeting.

A conference site transitions to the Ready state 114 from the Being Assisted state 112 when the operator determines that the audio and video signal quality from the site is acceptable. In the Ready state 114, the conference is still in the pre-test period and therefore not yet active. The conference site in this state continues to receive music-on-hold and video greeting. When the conference becomes active, meaning that the pre-test period has ended or that the operator has chosen to activate the conference, the conference site transitions automatically from the Ready state 114 to the Active state 118 without any operator action. Alternatively, an operator can move a site to the Active state 118 directly from the Being Assisted state 112 if the conference has already been activated at the time the operator concludes offering assistance to the site. In either case, once a site reaches the Active state 118, the music-on-hold and video greeting are terminated and the site receives the normal conference audio and video signals instead.

Referring again to the Bypass state 116, a conference site in this state continues to receive the music-on-hold and video greeting. The site transitions from this state to the Active state 118 automatically without operator action once the associated conference is activated.

It should be noted that a site in the Ready state 114, the Bypass state 116, or the Active state 118 may develop technical problems requiring assistance from the operator. Therefore, an operator can move a site from any of these states back into the Being Assisted state 112 for troubleshooting as needed. The transitions out of the Being Assisted state 112 to the Ready, Bypass, or Active states is then the same as described above.

To assist a conference site, the operator can use one of four horizontal buttons in the site action area 104 under the site information window 102. The buttons are labeled Attach 104*a*, Detach/No Problem 104*b*, Detach/Problem 104*c* and Bypass 104*d*. One of the sites must be selected in the site information window 102 in order to make the site action buttons functional.

The Attach button 104*a* allows the operator to have a one-on-one conference with the selected site. This site action can be used at any time for the entire duration of the conference so long as the operator site is not busy helping another site. This is the subconferencing feature of the conference. Note that the site itself cannot initiate or signal for assistance within the confines of the conference. The site can only request assistance using a separate telephone connection to the operator. Both the Detach/No Problem button 104*b* and the Detach/Problem button 104*c* allow the operator to terminate the subconference. Upon selection of the Detach/No Problem button 104*b*, the site state will then be shown in the site information window 102 as the Ready state 114 if the conference is still pending or the Active state 118 if the conference is active.

The Detach/Problem button 104*c* allows the operator to suspend the site in the conference operator queue and mark the site as having a problem. This site will now be in the Problem state 113 and will not be an active participant in the conference. This can be helpful for troubleshooting a conference that is having difficulties. The operator can systematically place sites in the queue temporarily to diagnose technical problems. The Bypass button 104*d* allows the operator to send the site into the conference without having a one-on-one conference. This button is available only when the conference site has not been helped by the operator yet, i.e., the site is currently in the Waiting state 110.

The MCU of the present invention provides for transition or conversion between conferencing modes. An unattended conference can be converted to an attended conference via a conference control function that results in an operator site being added. By the same token, when deleting the operator site in an attended conference, the conference is automatically converted to an unattended conference. The process of adding and deleting an operator site is performed via the conference hold queue screen 100.

Three radio buttons located in the conference mode area 106 allow the conference operator to switch among the conference modes. Any change to the current conference mode will prompt a confirmation dialog box to prevent inadvertent errors. The effects of conference mode changes are described in Table 1.

TABLE 1

| From/To | Attended/Operator Assisted | Attended/ Bypass | Unattended |
| --- | --- | --- | --- |
| Attended/ Operator Assisted | NA | Any sites in the Waiting state will be automatically sent into the conference via bypass. | Operator site is deleted. All sites, except inactive sites, regardless of state are sent into the conference after operator acknowledgment through a confirmation dialog box. |
| Attended/ Bypass | Any newly arrived sites become Waiting sites. The operator can now help these sites into the conference. | NA | Operator site is deleted. All sites, except inactive sites, regardless of state are sent into the conference after an operator acknowledgment through a confirmation dialog box. |
| Unattended | The operator is prompted to add an operator site. Once the operator site is correctly added, attended/ operator assisted mode is entered. | The operator is prompted to add an operator site. Once the operator site is correctly added, attended/ bypass mode is entered. | NA |

Figure 6A:
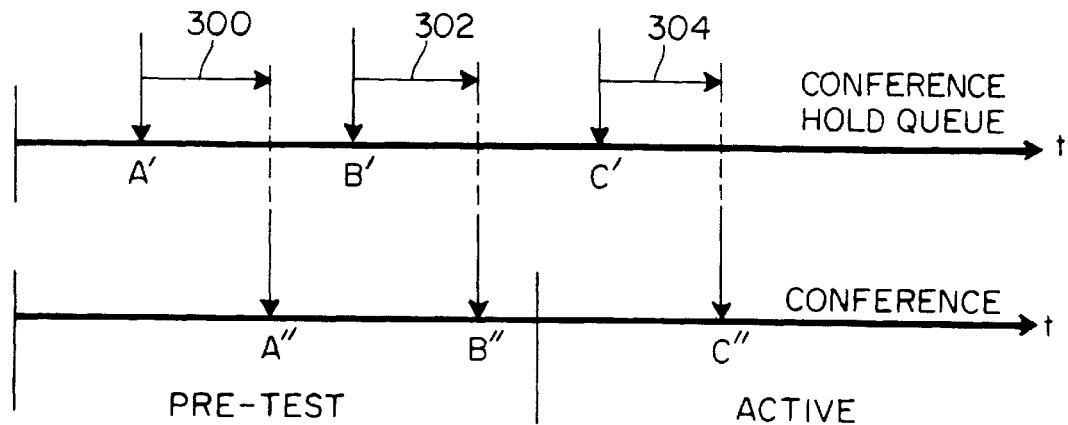
FIGS. 6A–6B illustrate attended conference scenarios in accordance with the present invention.

Having described the conference operator queue, example attended conference scenarios will now be described with reference to FIGS. 6A–6B. In FIG. 6A, an operator attended conference timeline is shown in which site A enters the conference hold queue at point A' followed by site B at point B'. Sites A and B remain in the conference queue for a period 300 and 302, respectively. During the respective queuing periods, each site initially receives music on hold. Once each site's video is ready, the first audio "welcome" message is received along with the video greeting. This is then followed by the second "operator-assisting" message. While conference participants at both sites are hearing music-on-hold and seeing the video greeting, the operator receives an indication in the conference hold queue screen 100 (FIG. 4) that both sites are currently in the Waiting state.

During period 300, the operator conducts a subconference with Site A. In this example, the operator detaches site A from the subconference at point A" and the site enters the Ready state for the pre-test period of the conference. Site A continues to receive music-on-hold and the video greeting while waiting for the conference to start. The operator repeats the same actions with respect to Site B during period 302. At point B", site B detaches from the subconference with the operator and enters the Ready state for the remainder of the pre-test conference period. When the pre-test period ends, Sites A and B become active in the conference. Meanwhile, Site C attempts to join the conference after the pre-test period at point C'. Site C is placed in the conference hold queue at point C' for a period 304, during which it receives assistance from the operator in a subconference. However, when the operator detaches site C from the subconference at point C", site C is cut directly into the active conference. Thereafter, sites A, B, and C are in the active conference.

Figure 6B:
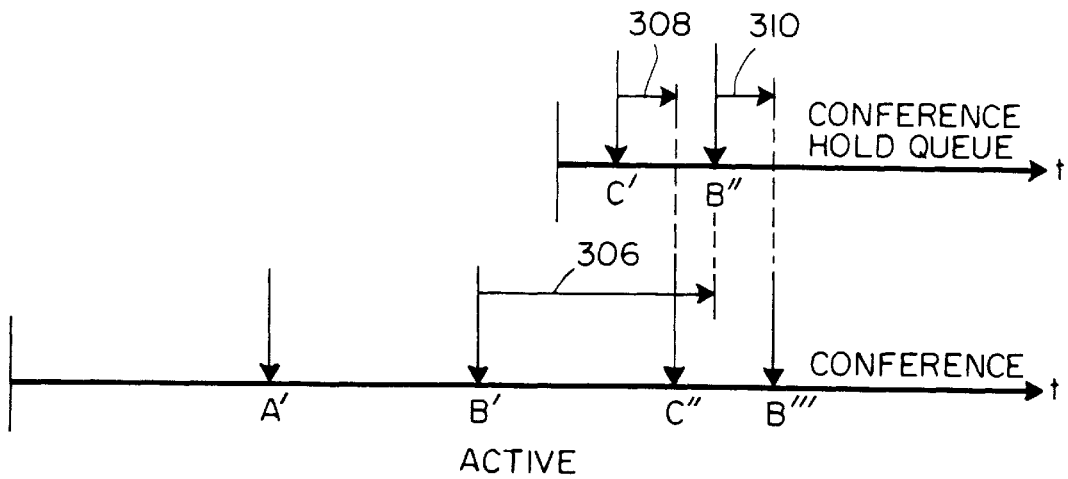

Referring to FIG. 6B, a timeline is shown in which conference sites A and B directly join an unattended conference at points A' and B', respectively, without having spent time in a conference hold queue. Each site may receive music on hold, the first audio message and video greeting for a period of time as specified by the conference definition. However, since pre-test time for an unattended conference has no meaning, sites A and B then enter immediately into active conferencing. In this example, the operator decides to change the scheduled unattended conference mode to an attend/operator assisted conference while the conference is underway. At point C', site C attempts to join the conference and is placed in the queue for a period 308, during which it receives assistance from the operator in a subconference. When the operator detaches site C from the subconference at point C", site C is cut directly into the active conference.

In this example, after site B has been in the active conference for a period 306, the operator decides to have a subconference with site B because trouble is indicated for site B's audio in the site window 102. The operator reattaches site B from the conference queue at point B" to start a subconference and begins an investigation. After a period 310, the operator detaches site B from the subconference and site B rejoins the active conference at point B".

The foregoing has described the use of audio and video messaging to "meet and greet" conference participants connecting to the MCU. A preferred embodiment for implementing the audio and video messaging aspects of the invention will now be described.

In the preferred embodiment, pre-recorded audio and video messages are stored in system storage such as a hard disk, of the MCU 10. As noted above, the BPU 22 includes a DSP pair (DSP1, DSP2 labeled 40, 42 in FIG. 3) for each conference participant/codec. At conference setup, each participant is assigned to a DSP1, DSP2 pair. At this time, the audio and video messages are retrieved from the system storage and are downloaded to the DSP1 private SRAM 46 through the HPU Interface 41 (FIG. 3). In the preferred embodiments, two audio messages are downloaded, the first a "welcome" message and the second an "operator will assist you" message. The audio messages are stored in the DSP1 private RAM 46 as G.711 PCM data in 32 bit words. G.711 PCM (pulse code modulation) is the most common audio format. When an audio message is required, the data is extracted from the buffer and G.711 expanded by the DSP1. The expanded audio is then passed to the DSP2 where it replaces the audio sample normally present on the BPU bus 36.

Figure 7:
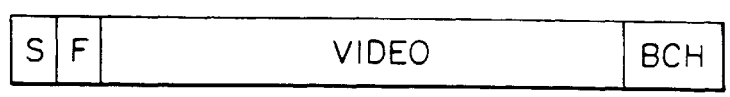
FIG. 7 shows an H.261 BCH block for use in the present invention.

The video image is also stored in the DSP1 private RAM 46, encoded as a single H.261 QCIF intra mode frame. QCIF (quarter-common intermediate format) provides the lowest common video quality at 144 lines by 176 pixels resolution. The image is stored in an integer number of H.261 BCH blocks (512 bits or 16 words each). A single H.261 BCH frame is shown in FIG. 7. The 512 bit frame includes a synch bit S and a fill flag bit F, followed by video bits. A BCH error checking code completes the frame.

Figure 8:
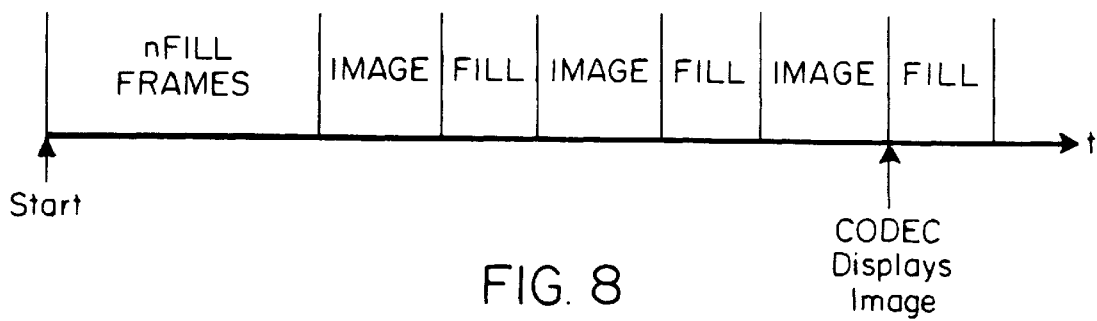
FIG. 8 illustrates a timeline of events associated with image playback in accordance with the present invention.

Referring now to FIG. 8, a timeline shows events associated with playback of the video image from the DSP1 private RAM to the associated codec 38. To playback the video image, a freeze picture command is sent to the associated conference participant's codec, shown as "START" in FIG. 8. The normal output video stream to that codec is then replaced with H.261 fill frames for a sufficient period to ensure codec synchronization. The image blocks are then read out of memory and placed into the H.221 framing. After all the image blocks have been sent, fill frames are sent to adjust the picture rate. The amount of fill frames required depends upon the frame rate negotiated with the endpoint codec 38. The image blocks followed by the fill frames are continuously sent until the video image is stopped by another command from the DSP CP 44. Depending on the particular model or type of codec, the codec displays the video image after some number of repetitions of the image blocks. The first audio message is synchronized to be sent when the codec displays the received video image.

In the preferred embodiment, the video image maximum size is about 8 K bytes, but the size can vary depending on the picture content. The first audio message, the "welcome" message, and the second audio message, the "operator will assist you" message, can last up to 9 seconds. It should be noted that these message lengths are based on the storage constraints of a particular embodiment of a BPU 22.

It will be understood by those skilled in the art that the invention contemplates storage of multiple video and audio messages customized to individual conference participants or conference service providers. For example, the audio and video messages could be customized to the language spoken by the conference participant. A video message customized for a particular conference service provider may include a specific service logo. In addition, though the preferred embodiment employs a still video image, a series of images as in a video clip could be used instead.

In addition to the audio and video messages stored in the DSP1 for playback, conference participants receive music-on-hold before a conference becomes active. The Audio Interface Unit (AIU) 26 (FIG. 2) provides a music on hold signal in G.711 format to the Network bus 34 from an audio source 30. The music-on-hold signal is assigned a dedicated timeslot on the Network bus 34. All conference participants that are in the conference states Waiting 110, Problem 113, Bypass 116 or Ready 114 (FIG. 5) receive music-on-hold from this timeslot.

Figure 9:
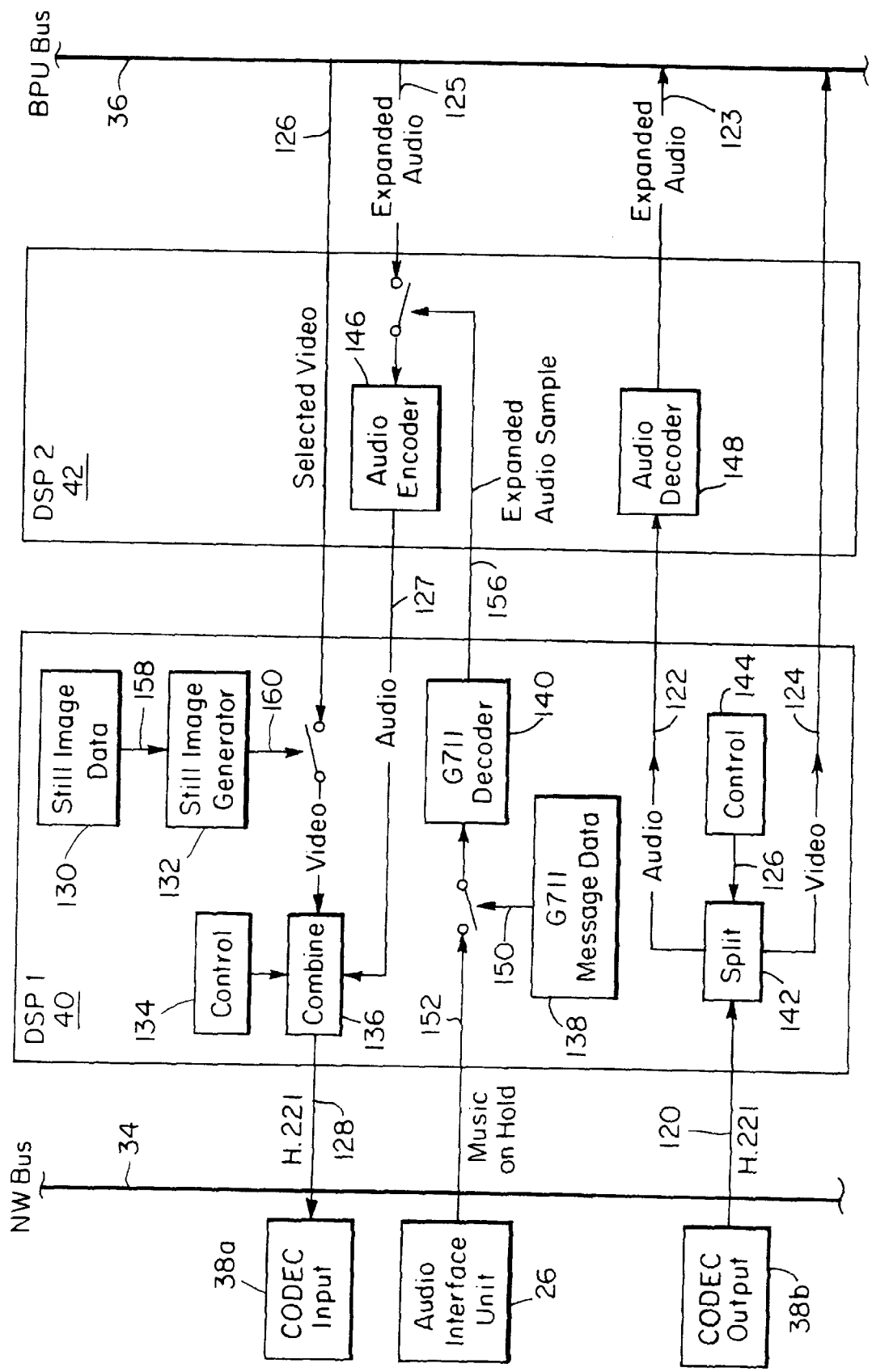
FIG. 9 is a block diagram illustrating the flow of audio and video streams in an MCU according to the present invention.

Referring now to FIG. 9, the flow of audio and video streams in accordance with the present invention will be described. In this functional block diagram, only one DSP1 40, DSP2 42 pair is shown representing BPU 22 (FIG. 3) to simplify the description. The normal flow will first be described followed by the flow according to the present invention.

In the normal stream flow, that is, without the aforementioned audio and video greetings, a codec 38 (shown here functionally as separate codec input 38*a* and codec output 38*b*) outputs an H.221 frame 120 which is coupled to the Network bus 34. The H.221 frame, which includes audio, video and control information, is routed to the particular assigned DSP1 40 where a splitting function 142 is performed to split the H.221 frame 120 into separate audio, video, and control streams 122, 124 and 126, respectively. The control stream 126 is passed to a control function 144 for communication to the DSP CP 44 (FIG. 3). The video stream 124 is passed to the BPU bus 36 and made available for switching to other codecs 38. The audio stream 122 is passed to an audio decoder 148 in DSP2. The audio decoder 148 decodes the compressed audio stream 122 according to the coding algorithm for the assigned codec 38 (e.g., G.711, G.728, G.722, PT724). The decoder 148 passes the expanded audio 123 to the BPU bus 36 where it is made available for switching to other codecs 38.

In the opposite direction, audio and video streams 125, 126 respectively, are selected from the BPU bus 36 and passed to DSP2 42. The selected video stream 126 is passed through DSP2 42 to DSP1 40. The expanded audio stream 125 is passed to an audio encoder 146 which encodes the expanded audio stream according to the coding algorithm for the assigned codec 38. The encoded audio stream 127 and the selected video stream 126 are combined in combiner 136 with control information from control 134 to form a complete H.221 frame 128 that is placed on the Network bus 34 and transmitted to the assigned codec input portion 38a.

In the present invention, as noted above, individual audio and video messages are downloaded and stored in the private RAM 46 associated with each DSP pair 40, 42 (FIG. 3). Referring again to FIG. 9, DSP1 40 processes these messages, shown separately as still image data block 130 and G.711 message data block 138, as follows. A G.711 encoded audio message data stream 150 is passed to a G.711 decoder 140 in the DSP1 40. The decoder 140 provides an expanded audio stream 156 to the audio encoder 146 in DSP2 42. Under control of the CP 44 (FIG. 3) during conference queue pre-test time, the audio encoder 146 switches from encoding the expanded audio stream 125 to encoding the audio message stream 156 instead. The audio message stream 156 is similarly encoded according to the algorithm of the assigned codec 38 and passed to the combiner 136. If the conference state instead requires music on hold, the G.711 decoder 140 switches to decode a music on hold stream 152 received over Network bus 34 from the AIU 26.

When a conference participant enters a conference state in which a video greeting image is to be transmitted to the conference participant, DSP1 40 retrieves the still image data from memory block 130 as a video data stream 158 that is passed to a still image generator 132. Whereas the normally selected video stream 126 on the BPU bus 36 retains the H.221 framing it had from its source codec, the still image data stream 158 taken from 512 bit blocks of an H.261 intramode frame lacks H.221 framing. The still image generator 132, described further below, formats the video image data into the correct video block locations of H.221 frames. The DSP1 40 selects this H.221 framed video stream 160 instead of the normal selected video stream 126 from the BPU bus 36 and combines it with the audio message or music on hold stream 127 to complete the H.221 frame 128 for transmission to the codec 38a.

Referring now to FIGS. 10, 11A–11B and 12A–12B, the still image generator 132 will now be described. As noted above, the image generator 132 performs a formatting function to map 512 bit blocks of image data into appropriate video bit locations of an H.221 frame. Essentially, the image generator 132 performs a portion of the H.221 framing that is normally performed by an endpoint codec. The combiner 136 completes the H.221 framing by combining audio, video and control streams into the complete H.221 frame.

Figure 10:
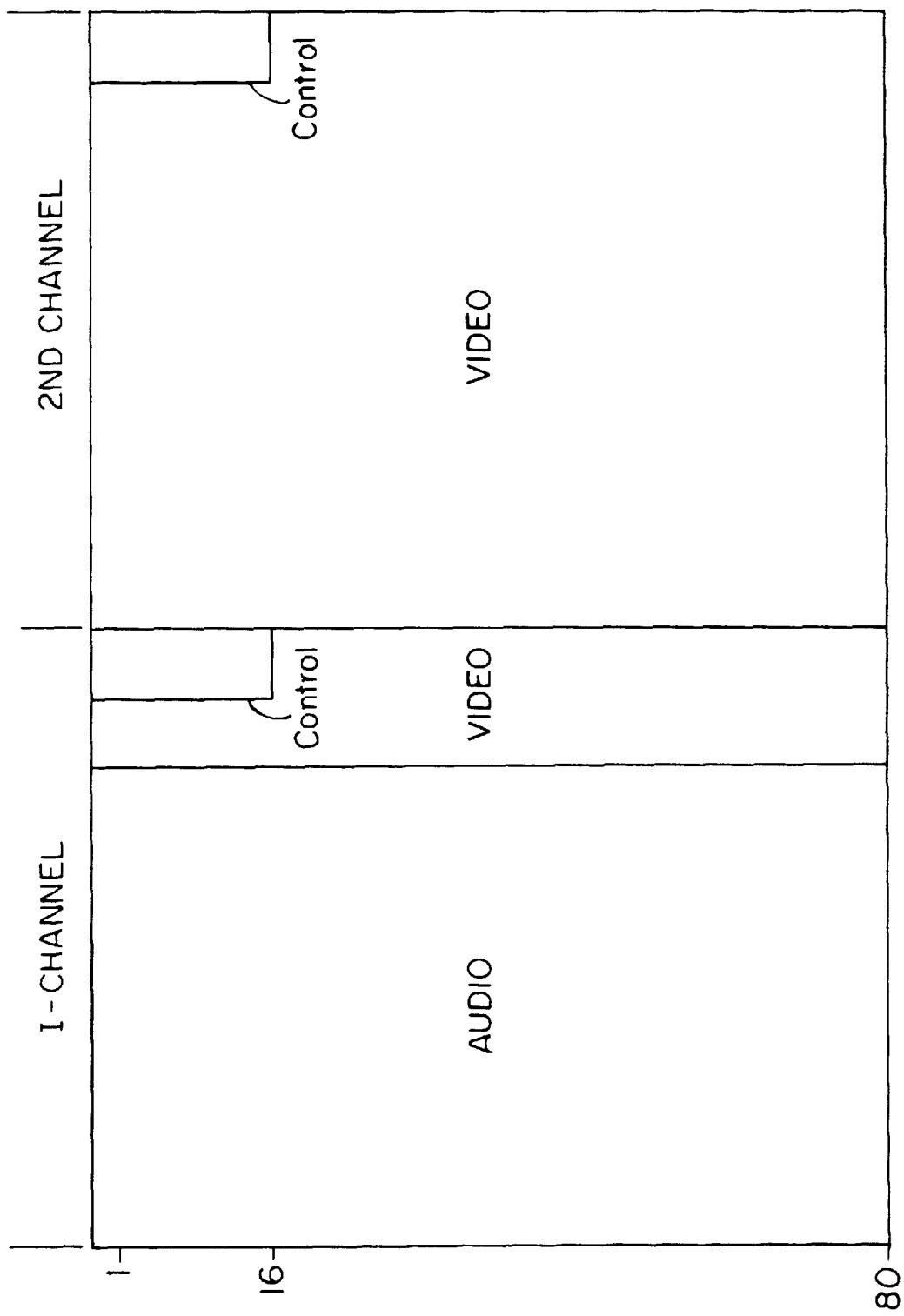
FIG. 10 shows an H.221 frame used in the conferencing system of the present invention.

FIG. 10 illustrates a typical bandwidth allocation for an H.221 frame in a two channel, 128 kbps ISDN connection.

The H.221 frame is two columns or channels by 80 rows. Each channel is 8 bits wide. The first channel, labeled the I-channel, includes bandwidth allocated for audio according to one of the several audio standards G.711, G.722, G.728 or PT724. The remaining bandwidth in the I-channel and in the second channel is allocated to video and control information. The control information is allocated one bit at the end position of each channel for each of the first 16 rows of the H.221 frame. The video bits take up the remaining bit positions as shown in FIG. 10.

Figure 11A:
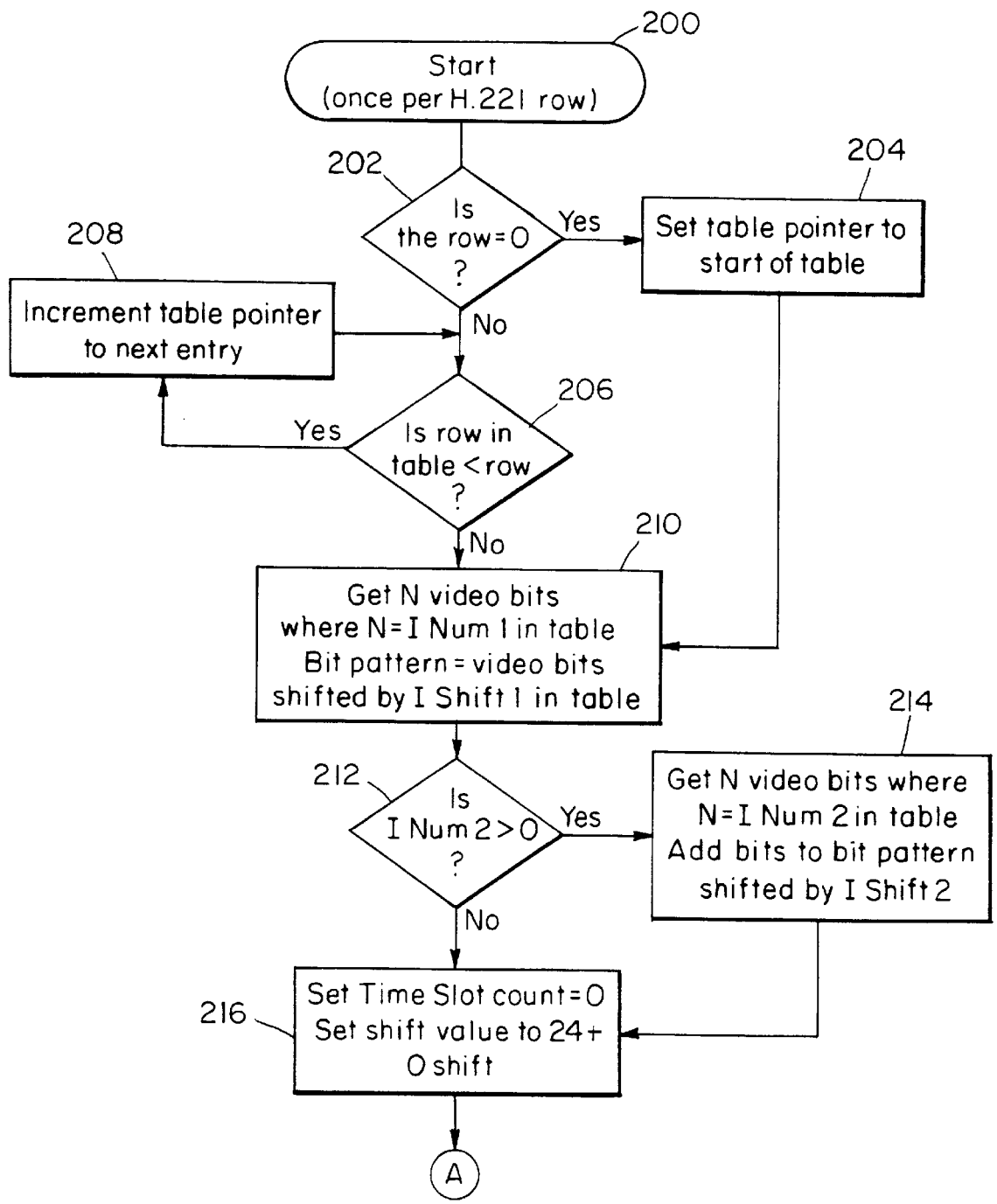
FIGS. 11A–11B illustrate a flow diagram for a still image generator function in accordance with the present invention.
Figure 11B:
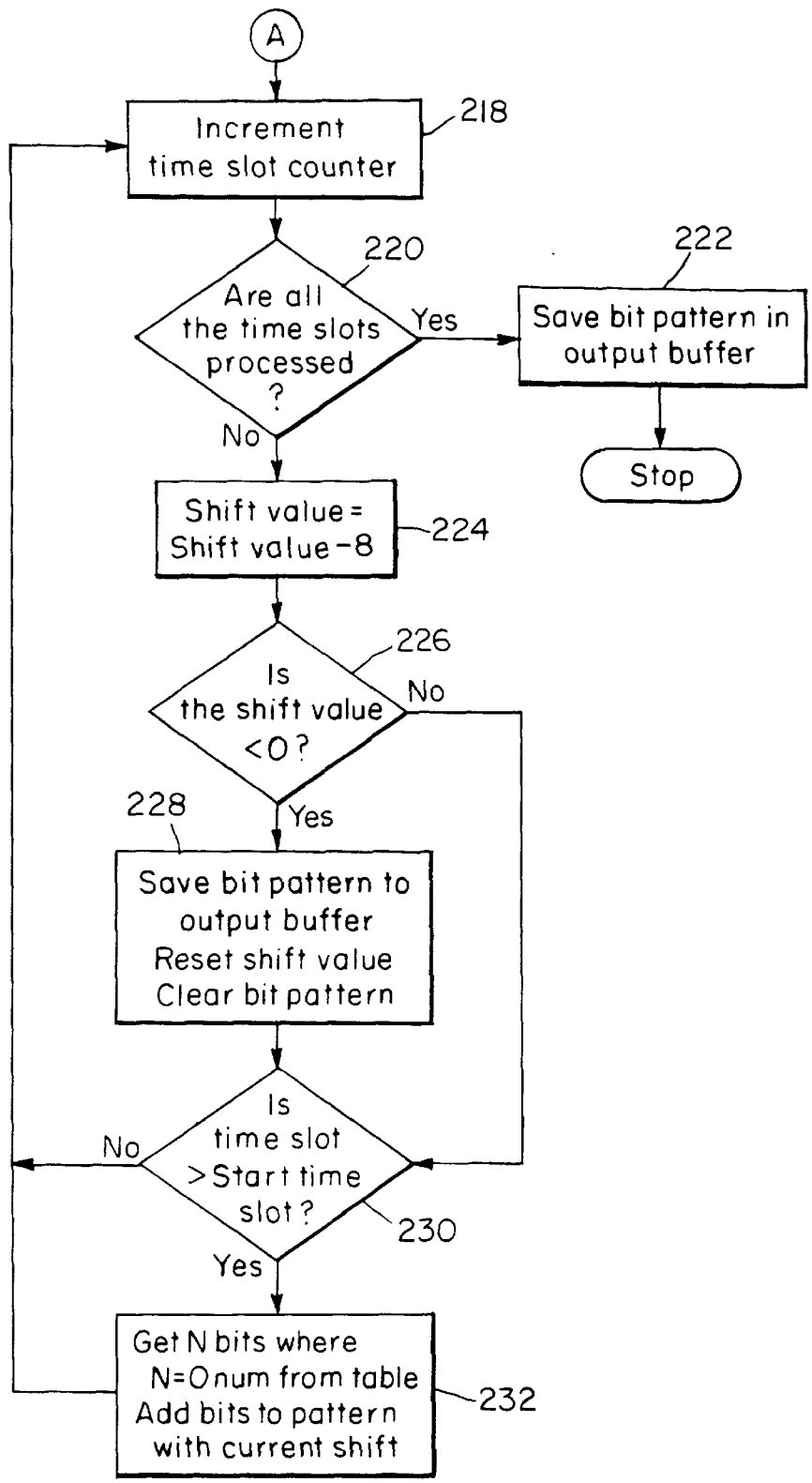

The mapping function of the image generator 132 is illustrated in FIGS. 11A–11B. Depending on the transmission rate negotiated between the MCU and the associated codec at the start of the conference, a video bit pattern appropriate for the rate is selected from memory. The video bit pattern indicates the locations or positions for allocating the image data to the H.221 frame. The pattern is stored in a table which comprises one or more entries having the following fields:

Row
    The ending row number for this pattern.
I Num 1
    Number of bits in first video block for I channel.
I Shift 1
    Locations for first video block.
I Num 2
    Number of bits in second video block for I channel (Optional).
I Shift 2
    Location of second video block.
O Num
    Number of video bits in each timeslot for other channels (Non-I channel).
O Shift
    Location of video block in other channels.

For example, for the H.221 frame shown in FIG. 10, the table might have the following entries:

| Row | I Num 1 | I Shift 1 | I Num 2 | I Shift 2 | O Num | O Shift |
|---|---|---|---|---|---|---|
| 16 | 1 | 1 | 0 | 0 | 7 | 0 |
| 80 | 2 | 0 | 0 | 0 | 8 | 0 |

The mapping process begins at step 200 for each row of the H.221 frame. At step 202, it is determined whether the mapping process is at the first row, i.e., row=0. If the current row is the first row, then a table pointer is set to the start of the bit pattern table at step 204 and processing continues at step 210. If the current row is not the first row, then at step 206, it is determined whether the value of the row field in the current pattern table entry is less than the current row being processed. If the row field value is less then the current row being processed, then at step 208, the table pointer is incremented to the next table entry. If the row field value is not less than the current row being processed, then processing continues at step 210.

At step 210, N video bits are retrieved from the still image data store 130 (FIG. 9), or from a fill frame, where N equals the value stored in the I Num 1 field of the current pattern table entry. The bit pattern for the current row is then set according to the retrieved video bits shifted by the value of the I Shift 1 field in the current pattern table entry to properly place the video bits in the first video block of the I-channel. At step 212, if the value of the I Num 2 field in the current pattern table entry is greater than zero, indicating that there are video bits in a second video block of the I-channel, then the next N video bits are retrieved from memory (FIG. 9), or from the fill frame, where N equals the value of the I Num 2 field of the current pattern table entry at step 214. These video bits for the second video block of the I-channel are added to the bit pattern shifted by the value of the I Shift 2 field. Processing continues at step 216.

If the value of the I Num 2 field is not greater than zero at step 212, then processing continues at step 216. The remainder of the processing relates to handling the other (non-I) channels of the H.221 frame. A time slot counter is set to zero and a shift value counter is set to 24 plus the value of the 0 Shift field at step 216. The time slot represents one 8 bit column in the H.221 frame.

Referring now to FIG. 11B, processing continues at step 218 wherein the time slot counter is incremented. At step 220, if all the time slots have been processed, then the bit pattern is saved in an output buffer at step 222 and the processing of the next H.221 row begins at step 200. If all the time slots have not been processed at step 220, then the shift value counter is set to the previous value minus 8 at step 224. At step 226, a check is made to see if the word is completed by determining if the shift value has become negative. If the shift value is positive, processing then continues at step 230. If the shift value is negative, indicating that the word is completed, then the bit pattern is saved in the output buffer at step 228. The shift value is also reset to the value set in step 216 and the bit pattern is cleared.

At step 230, a check is made to see if the time slot counter is greater than a start time slot parameter to make sure the current time slot is in a range for replacement. If the current time slot count is in the range, then at step 232, the next N video bits are retrieved from storage (FIG. 9) or from the fill frame, where N equals the value of the O Num field of the current pattern table entry. The bits are placed into the correct location specified by the current shift value. Processing continues in a loop at step 218.

Figure 12A:
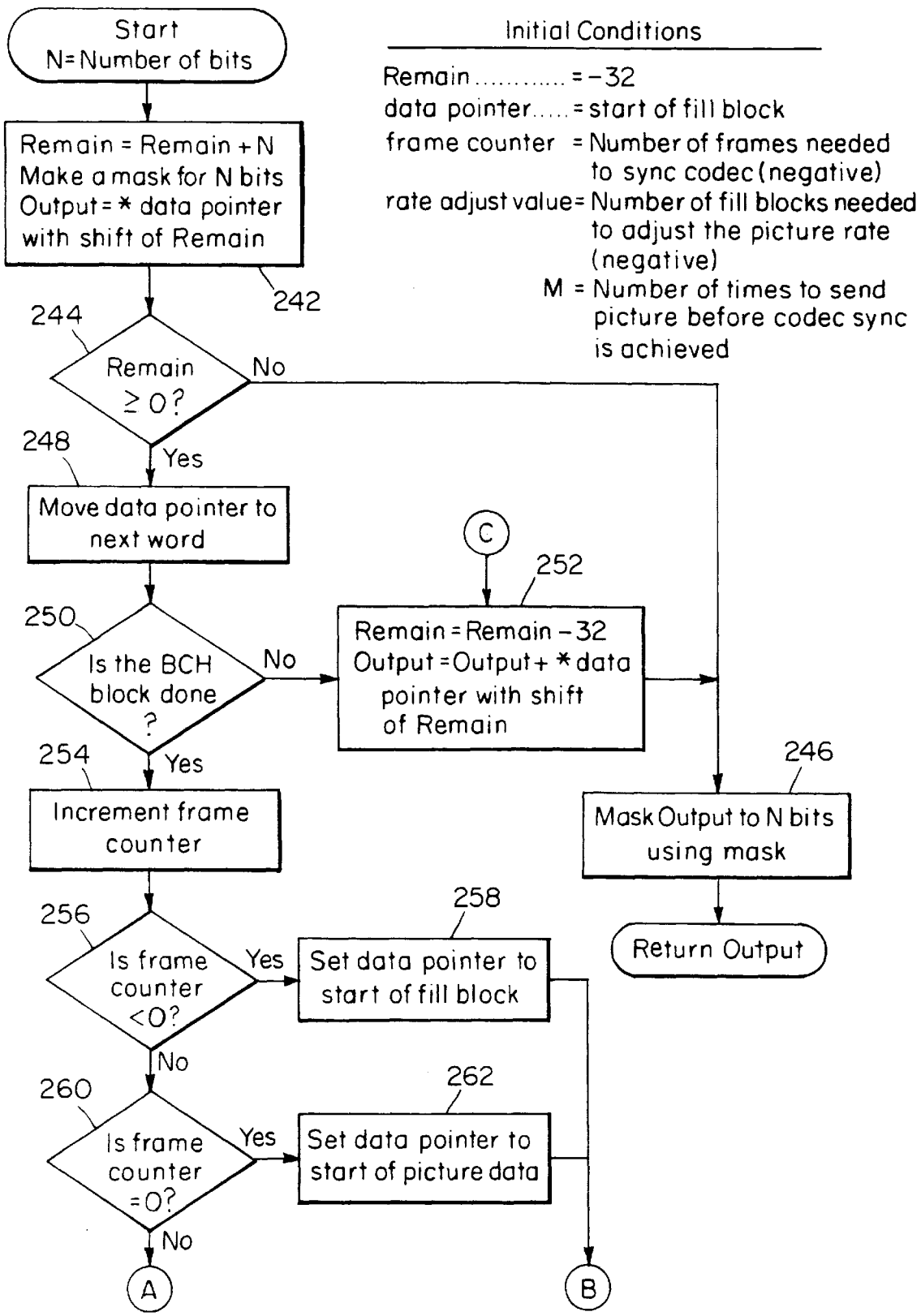
FIGS. 12A–12B illustrate a flow diagram for a video bits retrieval function of the still image generator in accordance with the present invention.
Figure 12B:
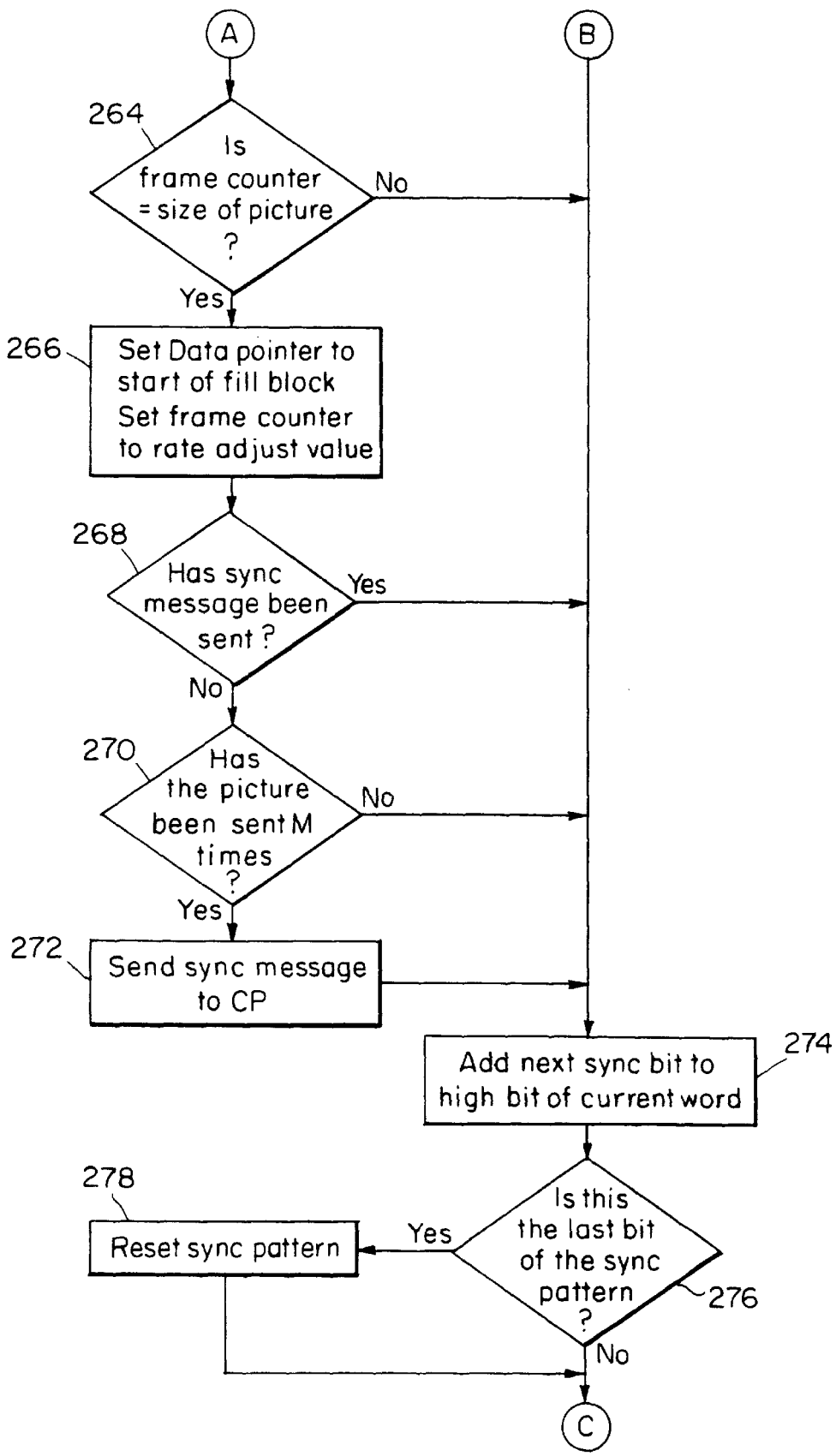

Each of steps 210, 214 and 232, includes retrieving N video bits from the still image buffer or from the fill frame. A process for retrieving the N bits is shown in FIGS. 12A–12B. At the initial step 242, a Remain counter, initially set to a value of −32, is incremented by the value of N. A bit mask is constructed with all 1's, except that the lower N bits are set to 0's. A data pointer is initially set to point to the start of the fill block. The output is initially set to the value stored at the data pointer value shifted by the value of the Remain counter. At step 244, a check is made to see if there are enough bits in the current word by determining whether the Remain counter has become non-negative. If the Remain counter is still negative, then at step 246, the output is masked to N bits and the processing ends.

If the Remain counter is still non-negative at step 244, processing continues. At step 248, the data pointer is moved to the next word. A check for the BCH frame boundary is made at step 250, wherein a BCH frame comprises 16 words. If the BCH frame boundary is not detected, then at step 252 additional bits are retrieved. The Remain counter is adjusted by 32 and the Output is set to the previous value of the Output combined with the value stored at the data pointer value shifted by the value of the Remain counter. The Output is then masked to N bits at step 246 and processing ends.

If the BCH frame boundary is detected at step 250, then processing continues at step 254. A frame counter that indicates the number of fill frames that need to be sent to synchronize the endpoint codec has an initial value typically equal to 70 and is stored as a negative counter. At step 254, the frame counter is incremented. A check is made at step 256 to determine whether the frame counter is still negative, indicating that fill frames are being sent. If the frame counter is negative, then at step 258, the data pointer is set to the start of the fill block in memory. Processing continues at step 274.

If the frame count is not negative at step 256, then at step 260, if the frame counter=0, the image data block is started by setting the data pointer to the start of image data at step 262. Processing continues at step 274. If the frame counter is not equal to zero at step 260, then processing continues at step 264, shown in FIG. 12B. At step 264, the frame counter is compared to the image size. If the frame counter value is not equal to the image size, then processing continues at step 274. If the frame counter equals the image size, then at step 266, the data pointer is set to the start of the fill block and the frame counter is set to a rate adjust value representing the number of fill blocks needed to adjust the image rate.

The DSP CP 44 (FIG. 3) is sent a sync message by DSP1 to allow the CP to synchronize the still image and the audio messages. This message is sent at step 272. To reach that step, a check is made at step 268 to see if the synchronization message has not been sent and whether the image data has been sent M times, where M equals the number of times to send the image before codec synchronization is achieved. M is typically set to 3. If the sync message has been sent at step 268 or if the picture has not been sent M times at step 270, then processing continues at step 274. A sync bit from the BCH frame sync pattern is added to the most significant bit of the current word at step 274. If the last bit of the sync pattern has been reached at step 276, then the sync pattern is reset at step 278. Processing continues following connector C back to step 252 (FIG. 12A).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A multipoint control unit for conferencing a plurality of audiovisual terminals comprising:
   a source for providing a video greeting; and
   a processor for controlling playback of the video greeting to an audiovisual terminal connected to the multipoint control unit, the processor transmitting the video greeting to the audiovisual terminal during conference setup.

2. The multipoint control unit of claim 1 wherein the source further provides audio data and wherein the processor further controls playback of the audio data to the audiovisual terminals.

3. The multipoint control unit of claim 1 wherein the video greeting comprises a still image.

4. The multipoint control unit of claim 3 wherein the video greeting comprises an H.261 QCIF intramode frame.

5. The multipoint control unit of claim 4 wherein the video greeting further comprises fill blocks for synchronizing framing between the multipoint control unit and the connected audiovisual terminal.

6. The multipoint control unit of claim 1 wherein the video greeting comprises a series of images.

7. In a video teleconferencing system having a plurality of audiovisual terminals and a multipoint control unit for conferencing the terminals, a method for operating the teleconferencing system comprising the steps of:
   providing a stored video greeting;
   connecting one of the terminals to the multipoint control unit; and
   transmitting the video greeting to the connected terminal for display.

8. The method of claim 7 wherein the video greeting comprises a still image.

9. The method of claim 8 wherein the video greeting comprises an H.261 QCIF intramode frame.

10. The method of claim 8 further comprising the step of transmitting fill blocks to synchronize framing between the connected terminal and the multipoint control unit.

11. A video teleconferencing system comprising:

a plurality of user sites, each site having an audiovisual terminal;

a multipoint control unit for conferencing the audiovisual terminals, the multipoint control unit having a processor for controlling playback of a video greeting; and an operator site connected to the multipoint control unit for controlling a conference, the operator site having means for placing the terminals in an operator queue;

wherein the processor transmits the video greeting to the queued terminals during conference setup.

12. The system of claim 11 wherein the operator site further includes means for selecting one of the queued terminals, means for conducting a subconference between the selected terminal and the operator site, and means for placing the selected terminal into the conference.

13. The system of claim 11 wherein the video greeting comprises a still image.

14. The system of claim 13 wherein the video greeting comprises an H.261 QCIF intramode frame.

15. The system of claim 11 wherein the video greeting comprises a series of images.

16. A method for operating a video teleconferencing system comprising the steps of:

providing an operator site for controlling a conference;

providing a plurality of user sites, each site having an audiovisual terminal;

providing a multipoint control unit for conferencing the audiovisual terminals and the operator site;

providing a video greeting;

connecting one of the audiovisual terminals to the multipoint control unit;

placing the connected audiovisual terminal into an operator queue at the operator site; and transmitting the video greeting to the queued terminal.

17. The method of claim 16 further comprising conducting a subconference between the queued terminal and the operator site and placing the queued terminal into the conference.

18. The method of claim 16 wherein the video greeting comprises a still image.

19. In a videoconferencing system in which an audiovisual terminal connected to a multipoint control unit receives a first stream of frames of video and audio data, a method for operating the videoconferencing system comprising the steps of:

providing a video greeting;

interrupting the first stream of frames at the multipoint control unit;

placing the video greeting into frames to form a second stream; and transmitting the second stream of frames to the connected audiovisual terminal.

20. The method of claim 19 further including the step of placing a series of fill frames into the second stream periodically.

21. A method of operating a conference, comprising:

using stored video data to generate a first signal representative of a first greeting;

transmitting the first signal to a first audiovisual terminal;

connecting the first audiovisual terminal and at least a second audiovisual terminal in a conference.

22. A method according to claim 21 wherein the first greeting comprises a still image.

23. A method according to claim 21 further comprising:

using stored video data to generate a second signal representative of a second greeting;

transmitting the second signal to the second audiovisual terminal.

24. A method according to claim 23 wherein the first greeting is substantially identical to the second greeting.

25. A method according to claim 23 wherein the first and second greetings comprise still images.

26. A method according to claim 21 further comprising connecting the first audiovisual terminal and a third audiovisual terminal in a conference before connecting the first and second audiovisual terminals in a conference.

27. A method according to claim 26 wherein the third audiovisual terminal is an operator terminal.

28. A method according to claim 26 further comprising terminating the conference between the first and third audiovisual terminals before connecting the first and second audiovisual terminals in a conference.

29. A method according to claim 21 further comprising generating a third signal representative of music and transmitting the third signal to the first audiovisual terminal before connecting the first and second audiovisual terminals in a conference.

30. A method according to claim 29 wherein the third signal is generated in response to data received from an audio source.

31. A method of conferencing two or more audiovisual terminals, comprising:

transmitting stored video data representative of a first greeting to a first of the audiovisual terminals before connecting the first audiovisual terminal and a second of the audiovisual terminals in a conference.

32. A method according to claim 31 further comprising transmitting stored video data representative of a second greeting to the second audiovisual terminal before connecting the first and second audiovisual terminals in a conference.

33. A method according to claim 31 further comprising connecting the first audiovisual terminal and a third audiovisual terminal in a conference before connecting the first and second audiovisual terminals in a conference.

34. A method according to claim 33 wherein the third audiovisual terminal is an operator terminal.

35. A method according to claim 33 further comprising terminating the conference between the first and third audiovisual terminals before connecting the first and second audiovisual terminals in a conference.

36. A method according to claim 31 wherein the first greeting comprises a still image.

37. A method according to claim 31 further comprising transmitting data representative of music to the first audiovisual terminal before connecting the first and second audiovisual terminals in a conference.

38. A method of operating a conference, comprising:

transmitting stored video data representative of a video greeting to a first audiovisual terminal;

transmitting stored video data representative of a video greeting to a second audiovisual terminal;

connecting the first and second audiovisual terminals in a conference.

39. A method of operating a conference, comprising:

connecting a multipoint control unit to a first audiovisual terminal via a first communications network;

using stored video data to generate a first signal representative of a first greeting;

transmitting the first signal from the multipoint control unit to the first audiovisual terminal via the first communications network;

connecting the multipoint control unit to a second audiovisual terminal via a second communications network;

using the multipoint control to connect the first and second audiovisual terminals in a conference.

40. A method according to claim 39 wherein the first greeting comprises a still image.

41. A method according to claim 39 further comprising using stored video data to generate a second signal representative of a second greeting and transmitting the second signal from the multipoint control unit to the second audiovisual terminal via the second communications network.

42. A method according to claim 39 further comprising using the multipoint control unit to connect the first audiovisual terminal and a third audiovisual terminal in a conference before connecting the first and second audiovisual terminals in a conference.

43. A method according to claim 42 further comprising terminating the conference between the first and third audiovisual terminals before connecting the first and second audiovisual terminals in a conference.

44. A method according to claim 42 wherein the third audiovisual terminal is an operator terminal.

45. A method according to claim 39 further comprising using the multipoint control unit to receive a signal representative of music and to transmit data representative of the music to the first audiovisual terminal before connecting the first and second audiovisual terminals in a conference.

46. A method of operating a conference, comprising:

connecting a multipoint control unit to a first audiovisual terminal via a first communications network;

using stored video data to generate a first signal representative of a first greeting;

transmitting the first signal from the multipoint control unit to the first audiovisual terminal via the first communications network;

connecting the multipoint control unit to a second audiovisual terminal via a second communications network;

using the multipoint control unit to transmit data received from the first audiovisual terminal via the first communications network to the second audiovisual terminal via the second communications network and to transmit data received from the second audiovisual terminal via the second communications network to the first audiovisual terminal via the first communications network.

47. A method according to claim 46 wherein the first greeting comprises a still image.

48. A method according to claim 46 further comprising using stored video data to generate a second signal representative of a second greeting and transmitting the second signal from the multipoint control unit to the second audiovisual terminal via the second communications network.

49. The method of claim 7 wherein the step of transmitting occurs during conference setup.

50. The method of claim 7 further comprising placing the connected terminals into a conference queue and wherein the step of transmitting the video greeting occurs after the terminal is placed into the conference queue.

51. The method of claim 7 further comprising transmitting a music signal to the connected terminal.

* * * * *

UNITED STATES PATENT AND TRADEMARK OFFICE
CERTIFICATE OF CORRECTION

PATENT NO. : 5,990,933
DATED : November 23, 1999
INVENTOR(S) : Daniel F. Ozone, et al It is certified that error appears in the above-identified patent and that said Letters Patent is hereby corrected as shown below:

Col. 17, Line 13: after "control" insert --- unit ---

Signed and Sealed this

Twenty-fourth Day of April, 2001

Attest:

NICHOLAS P. GODICI

Attesting Officer     Acting Director of the United States Patent and Trademark Office